United States Patent
Johnson

(10) Patent No.: US 6,950,269 B1
(45) Date of Patent: Sep. 27, 2005

(54) SYSTEM AND METHODS FOR USING SERVOPOSITIONING SIGNALS

(75) Inventor: Douglas W. Johnson, Stillwater, MN (US)

(73) Assignee: Imation Corp., Oakdale, MN (US)

( * ) Notice: Subject to any disclaimer, the term of this patent is extended or adjusted under 35 U.S.C. 154(b) by 458 days.

(21) Appl. No.: 10/052,696

(22) Filed: Jan. 18, 2002

(51) Int. Cl.[7] .................................. G11B 5/584
(52) U.S. Cl. .................. 360/77.12; 360/77.13; 360/31
(58) Field of Search ............... 360/48, 49, 69, 360/70, 72.2, 73.09, 75, 77.01, 77.12, 78.01–78.02, 360/31

(56) References Cited

U.S. PATENT DOCUMENTS

| | | | |
|---|---|---|---|
| 5,574,602 A | * | 11/1996 | Baca et al. ............... 360/77.12 |
| 5,689,384 A | | 11/1997 | Albrecht et al. |
| 5,872,672 A | * | 2/1999 | Chliwnyj et al. ......... 360/77.12 |
| 5,930,065 A | * | 7/1999 | Albrecht et al. ........... 360/72.2 |
| 6,021,013 A | | 2/2000 | Albrecht et al. |
| 6,134,070 A | * | 10/2000 | Tran et al. .................... 360/75 |
| 6,542,325 B1 | * | 4/2003 | Molstad et al. .......... 360/77.12 |

* cited by examiner

Primary Examiner—David Hudspeth
Assistant Examiner—Jason Olson
(74) Attorney, Agent, or Firm—Eric D. Levinson

(57) ABSTRACT

Servopositioning data is written onto a linear recording medium such that a position error signal is intentionally created. Precise control over the distance between servo signals simulates position error signals at any frequency or magnitude. Drives that normally assume that such distance is constant perceive the simulated position error signals as vertical tape motion. Thus, a servo writer can create such signals at pre-determined levels within the servo pattern.

34 Claims, 3 Drawing Sheets

SYSTEM AND METHODS FOR USING SERVOPOSITIONING SIGNALS

FIELD OF THE INVENTION

This invention concerns systems and methods for using servopositioning signals in linear recording media.

BACKGROUND OF THE INVENTION

Modern data storage systems use servopositioning (or, "servo") systems to guide their recording and playback components with respect to a recording medium, and thus enable high track density, which increases data storage capacity. Errors in the ability to follow the servopositioning signals on the medium can cause unacceptable reductions in storage capacity, recording/playback rates, and other parameters that are important to consumers (and thus to system manufacturers). For example, magnetic tape drives such as the IBM model 3570 and drives known under the names "Ultrium" and "Accelis" as described by the Linear Tape Open consortium use timing based servopositioning systems to accomplish these objectives.

SUMMARY OF THE INVENTION

The invention provides a method for writing servopositioning data onto a recording medium such that a position error signal is intentionally created at any desired magnitude and frequency. This provides valuable diagnostic information for drive manufacturers and consumers.

Specifically, one aspect of the invention is a linear recording medium that comprises a series of parallel servo transitions. The distances between adjacent transitions are modulated as a function of location of the transitions on the medium. Preferably, but not necessarily, the adjacent parallel transitions are immediately adjacent to each other. The medium could be a magnetic recording medium, a tape recording medium, or most preferably, a magnetic tape recording medium. Another aspect of the invention is a system for intentionally generating position error signal in a data recording drive. This comprises the combination of the recording medium just described and a recording drive. The drive, which is designed to expect essentially no modulation of distance between immediately adjacent parallel servo transitions on the medium, detects the signal created by the modulation of that distance through a servo read head. This signal may be used for a variety of independent purposes, such as: generating a position error signal in the data recording drive; measuring response of the servopositioning system, and especially the response to steps or other patterns in the modulated signal magnitude and/or frequency; simulating rapid transient motion of the linear recording medium; disabling a data write function in the drive if the position error signal exceeds a so-called "stop write" limit; and evaluating performance of the drive (e.g., by comparing the detected position error signal to an expected value).

BRIEF DESCRIPTION OF THE DRAWINGS

The accompanying drawings show a particular embodiment of the invention as an example, and are not intended to limit the scope of the invention.

DETAILED DESCRIPTION

In general terms, the invention can be embodied in an entire system of data recording and playback, including the combination of a drive and a linear recording medium; or as only the recording medium portion of such a system; or as methods for accomplishing certain tasks with such as recording medium, either alone or in combination with such a drive. Thus, while the following description focuses on the preferred embodiment of magnetic recording drives and magnetic recording tape compatible with such drives, this is not a limitation on the scope of the invention. Similarly, the following description focuses on the recording medium portion of the invention solely as a matter of convenience, and thus it should be understood to include other embodiments of the invention depending on the circumstances, such as combinations of the medium and drive, and methods of using such combinations or relevant portions of them. In that vein, the term "transition" should be understood broadly, especially when non-magnetic recording principles are involved.

Figure 1:
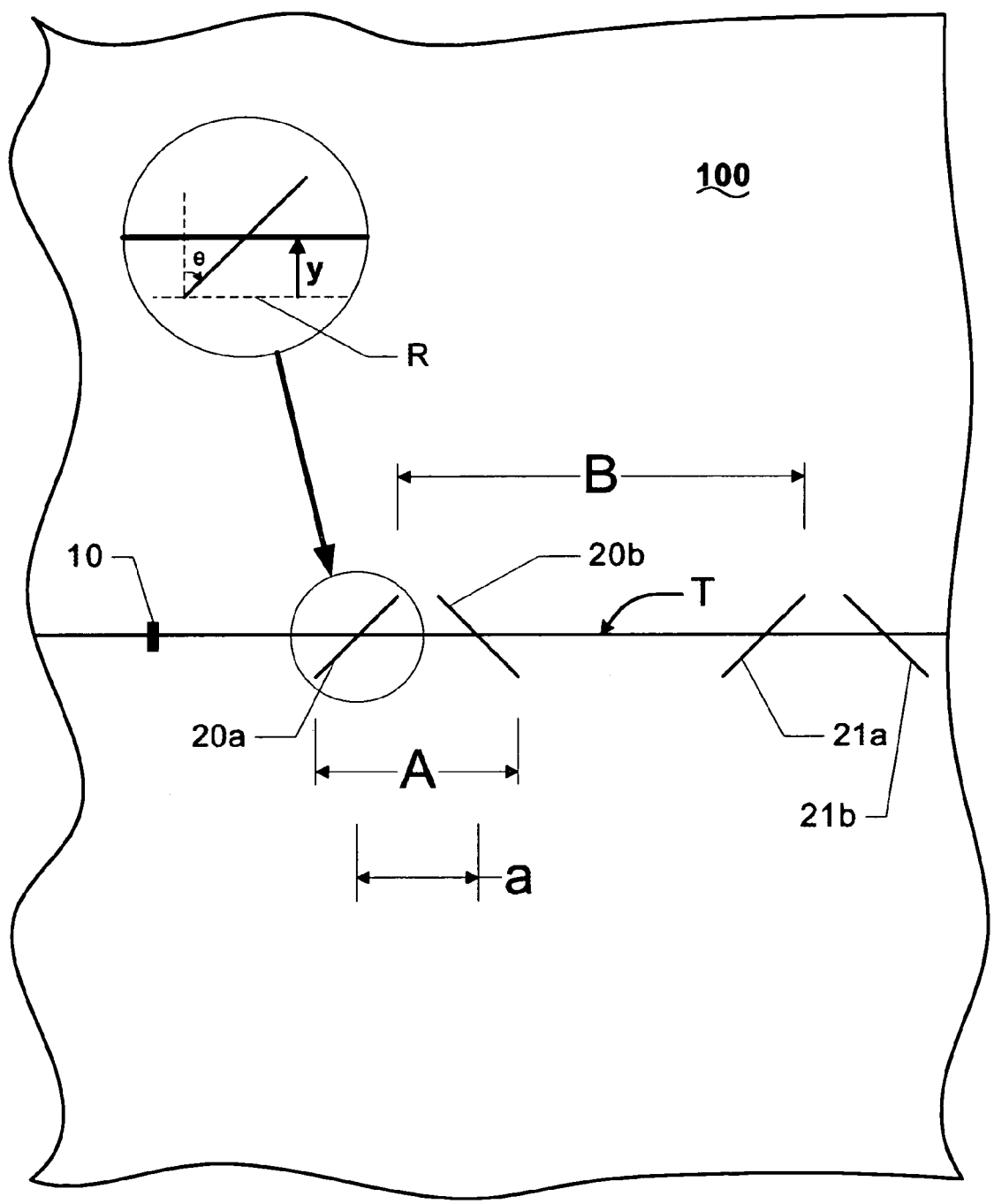
FIG. 1 is a schematic view of one embodiment of the invention.

FIG. 1 is a schematic view of a portion of a linear recording medium (such as a magnetic tape) in operation with a suitably compatible drive (not shown), according to an embodiment of the invention. The function of any track following servo system for linear recording drives is to provide servo read head lateral position information in a feedback loop so that the data read and write heads can be maintained on the proper track. Timing based servo systems, such as those described in U.S. Pat. No. 5,689,384 (the entire contents of which is incorporated by reference), utilize the time between servo pattern events as a measure of Position Error Signal (PES). The direction of media motion (e.g., "down" the length of a linear recording tape) is typically orthogonal to the direction controlled by the servo (i.e., across the width of the tape, transverse to the length). Thus, the servo pattern must translate timing in one direction to displacement in another.

One such pattern is shown in FIG. 1. The servo transducer is a read head (or the read portion of a read/write head) 10 that is much narrower than the angled, non-parallel transitions of the servo pattern, 20a and 20b. (In this and all embodiments of the invention, a servo transition, such as that labeled 20a, shown as a single signal, should be understood to also represent a burst of multiple parallel transitions.)

Servo read head 10 traverses the medium 100 in the y direction (i.e., transverse to the direction of tape motion), reading transitions 20a and 20b and thus indicating the position of the servo read head 10 with respect to the desired trackline T in a conventional manner. For a constant velocity along the recording medium in the longitudinal direction, and depending on the transverse location of servo read head 10, the width of the servo pattern in the longitudinal direction, a, changes. The distance a is geometrically related to the head lateral displacement, y, from reference line R (or a line parallel to R according to known principles).

Figure 2:
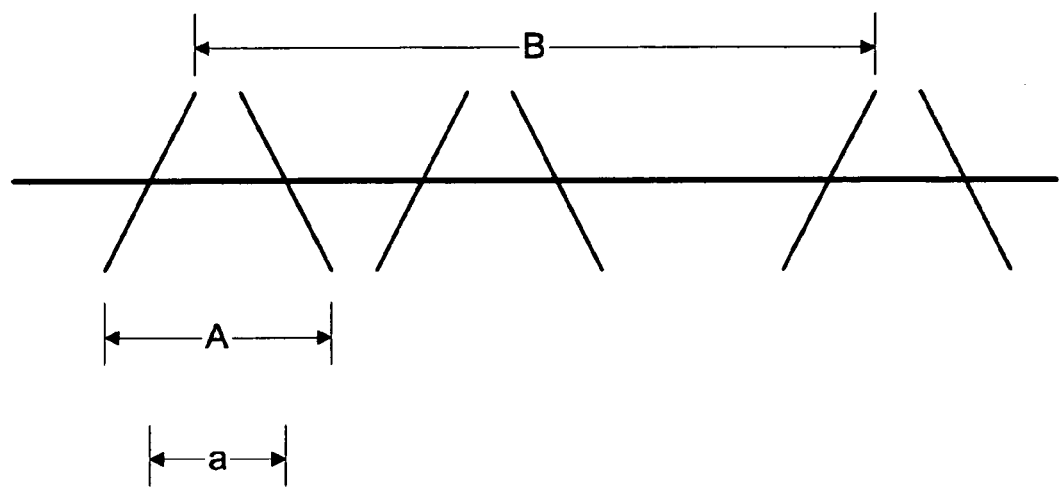
FIG. 2 is a schematic view of an alternative embodiment of the invention.

Because media speed perturbations would introduce error in the measurement, additional servo patterns are located on the medium so that repeated measurements can be made. Specifically, a third transition 21a is placed adjacent to, and parallel to, the first transition 20a at a distance B between successive parallel transitions, and a fourth transition 21b is similarly included. It should be noted that FIG. 1 shows immediately adjacent parallel transitions as a matter of convenience, and because it is the preferred embodiment, but as indicated in FIG. 2, in the general case it is only necessary that pairs of adjacent parallel transitions be selected, not necessarily immediately adjacent parallel transitions. The remainder of this discussion presumes the preferred embodiment only for convenience.

The relationship between y, $t_a$, $t_b$, and the geometry of the pattern, where $t_a$ and $t_b$ are the times to traverse distances a and B, respectively, are:

$$y = \frac{\left(A - B\frac{t_a}{t_b}\right)}{2\tan(\theta)} \quad (1)$$

where θ is the angle the parallel transitions 20a, 21a make with the transverse direction.

Both $t_a$ and $t_b$ are easily measured. If distance B is fixed, read velocity compensation is possible within the bandwidth allowed by the spacing distance. Servoposition patterns in which B is constant are known, including those disclosed in U.S. Pat. Nos. 5,689,384; 5,930,065; and 6,021,013 (each Albrecht et al.).

By contrast, the method of the invention relies on the exact opposite of the Albrecht et al. requirement that B be held constant over the length of the recording medium. That is, the invention comprises modulation of the B distance over (at least some of) the length of medium 100 to simulate PES. By precisely controlling B spacing while writing the series of parallel servo transitions on the medium, PES error at any frequency or magnitude can be generated. Conventional drives assume B is constant, and therefore will read a servo pattern having modulated variation in B as vertical motion of the recording medium. In this manner, a special servo writer can "write in" PES error at pre-determined levels. A good approximation of the PES error caused by a 1% variation in B spacing is:

$$PES = \frac{1}{100} \cdot \left(\frac{A}{2\tan(\theta)} - Y_t\right) \quad (2)$$

where $Y_t$ is the target position on the servo pattern.

For example, if A=70 μm, θ=6 degrees and $Y_t$=0 (at the bottom of the pattern), the PES error is 3.3 μm per percent error in B spacing.

Figure 3:
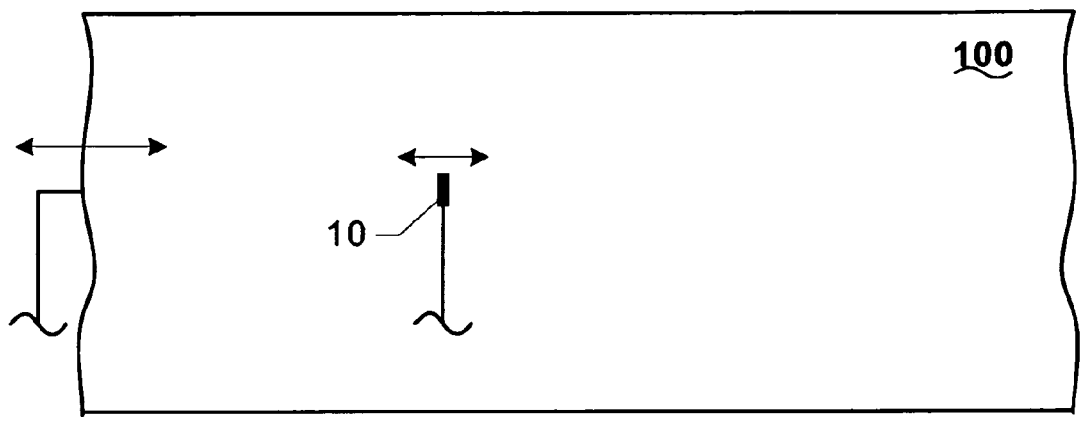
FIG. 3 is a schematic view of another embodiment of the invention.
Figure 3:
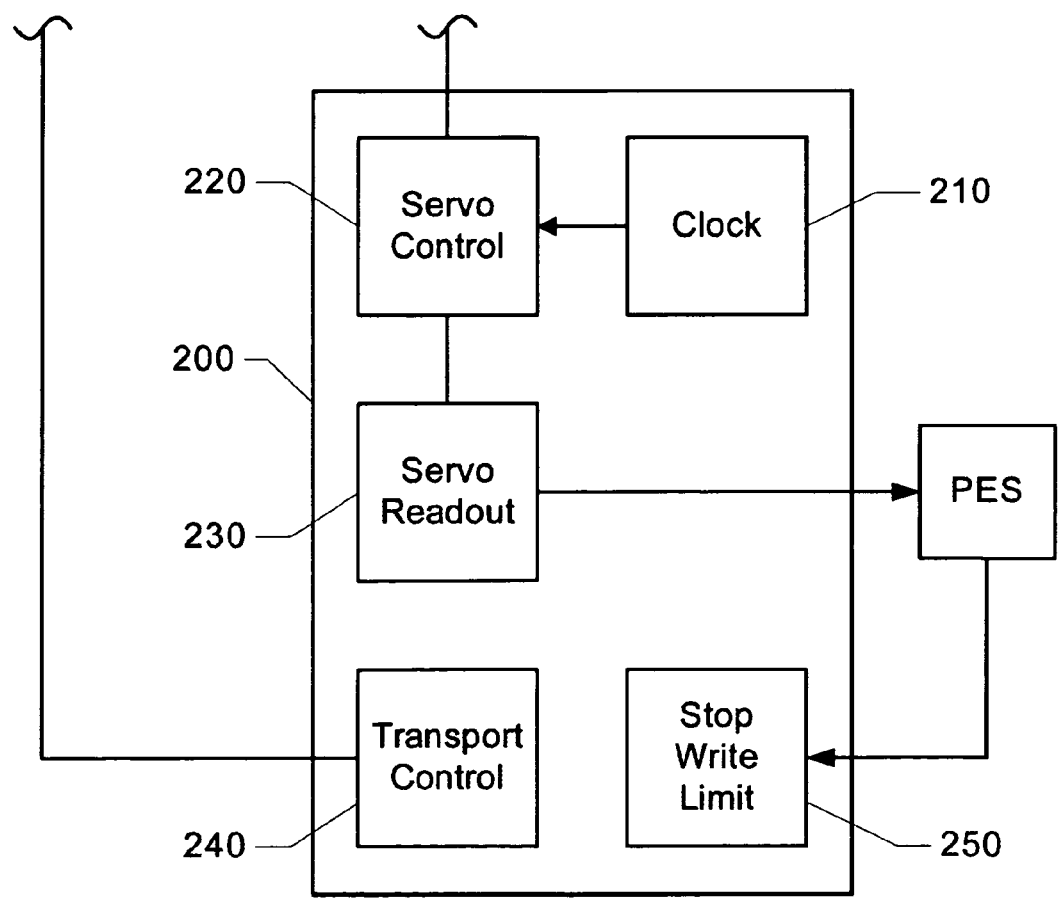

Referring to FIG. 3, modulation of the B distance may be accomplished by any means that adjusts the relative velocity of the servo write head (or the write portion of a read/write head) 10 to the medium 100. This will produce a PES signal from the servo readout circuit 230 of a drive 200. The preferred technique adjusts the clock 210 that serves the servo write head timing circuit 220. This has the advantage of not requiring a change in the normal behavior of the servo read head 10 and medium transport control 240, which is to move the medium at constant velocity relative to the servo read head. Another technique is adjusting either the longitudinal or vertical position of the medium, but this is not preferred because it requires sophisticated control of the medium transport mechanism. Similarly, adjusting either the longitudinal or vertical position of the servo write head 10 could be attempted, as indicated by the arrows adjacent to it in FIG. 3, but it is not preferred.

As compared to a baseline value of PES, there are at least three broad categories of intentionally introduced changes in PES value that may be implemented in accordance with the invention. One is a step response pattern, in which the PES value changes from the baseline value to some other value, and remains at the latter for a relatively long duration (e.g., as compared to the time required to measure the PES value). The second is a pulse response pattern, in which the PES value changes from the baseline value to some other value, then returns to the baseline magnitude during a fairly short time. The third is a frequency response pattern, in which the PES value changes between the baseline value and some other value and back to baseline again, repeating that cycle at a frequency which may be constant or variable over time. Other patterns of changing PES value are also within the scope of the invention. It is possible to introduce PES as a function of frequency and consider the performance of the system and/or media by analyzing the resultant Bode plot of PES (or residual PES) as a function of frequency.

A recording medium written with pre-determined PES error may be used in the following ways. First, by placing steps in the PES, a drive servo developer can measure the step response of the drive servo system. Second, PES steps of various magnitudes can simulate rapid transient motion of the medium for use in developing error recovery procedures. These can also be used to determine the "stop write limit," which is the amount of PES allowed by the drive before the data write function is disabled in an otherwise conventional manner. Third, by increasing PES stress (magnitude and/or frequency) over at least a portion of the length of the medium, drives from various manufacturers can be evaluated and ranked for servo performance. Fourth, media can be written with barely tolerable PES stress that can be used by drive manufacturers in a diagnostic test, such as a final test performed before shipping drives to vendors or customers.

Because the PES error is a function of $Y_t$ (vertical position of the servo read element on the servo pattern), targeting different positions on the pattern changes the magnitude of PES error. Using the example above, the PES error would be reduced to 1.7 μm per % of spacing error if the target position were 163 μm up from the base. Thus, by choosing different servo positions, it is possible to modify the magnitude of the error by nearly 2 to 1.

EXAMPLE

Figure 4:
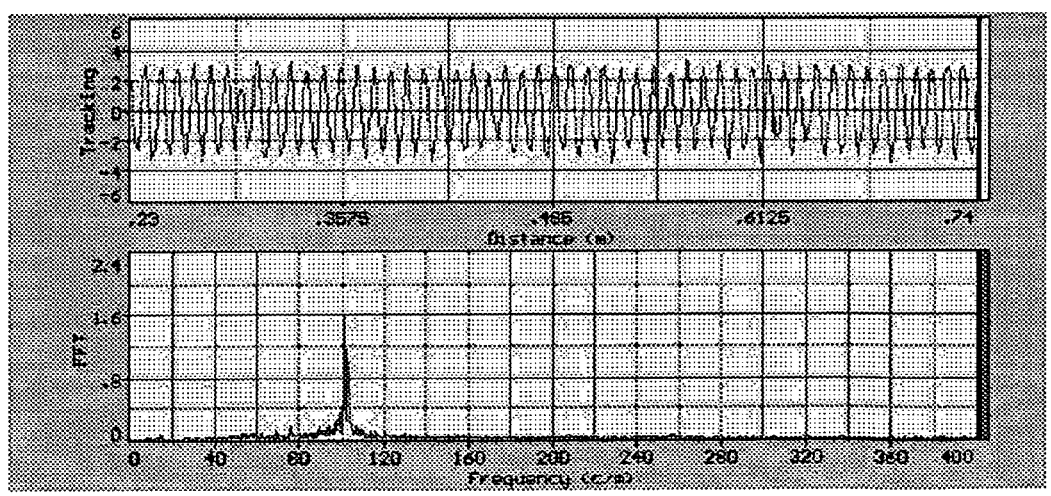
FIG. 4 is a display of the result of implementing the invention as described in the Example below.

A commercially available "Ultrium generation 1" magnetic tape recording drive was used with a compatible magnetic recording tape, modified as necessary according to the principles described above. Adjusting the clock in the servo write head timing circuit in an open-loop manner generated a varying PES signal. The tape was written to generate 3 micrometers of PES error at a frequency of 100 cycles/meter. FIG. 4 shows the results. The upper portion of the figure shows consistently varying position error signal at the ±3 micrometer levels, while the fast Fourier transformed signal appearing in the lower portion of the figure shows the 100 cycle/meter signal clearly distinguishable over background levels, at a signal magnitude of 1.5 micrometer peak (3 micrometer peak-to-peak). This demonstrated the feasibility of producing a signal capable of being detected by a servopositioning head according to embodiments of the invention described above.

I claim:

1. A linear recording medium, comprising a pattern of time-based servo transitions including first servo transitions non-parallel to second servo transitions, wherein the first servo transitions define a series of parallel servo transitions having modulated distances between adjacent parallel servo transitions as a function of location of the first servo transitions on the medium, the modulated distances being encoded to define position error signals such that a drive designed to expect essentially no modulated distances between adjacent parallel servo transitions on the medium will generate the position error signals.

2. The medium of claim 1, in which the adjacent parallel servo transitions are immediately adjacent.

3. The medium of claim 1, in which the linear recording medium is a magnetic recording medium.

4. The medium of claim 1, in which the linear recording medium is a tape recording medium.

5. A system for intentionally generating position error signals in a data recording drive, comprising in combination:
  a) a linear recording medium, upon at least a portion of which are recorded with a pattern of time-based servo transitions including first servo transitions non-parallel to second servo transitions, wherein the first servo transitions define a series of parallel servo transitions having modulated distances between adjacent parallel servo transitions as a function of location on the medium, the modulated distances being encoded to define position error signals; and
  b) a servo read head connected to the drive;
in which the drive is designed to expect essentially no modulated distance between adjacent parallel servo transitions on the medium, wherein the drive generates the position error signals encoded in the linear recording medium.

6. The system of claim 5, in which the adjacent parallel servo transitions are immediately adjacent.

7. The system of claim 5, in which the speed of the linear recording medium relative to the servo read head is constant.

8. A method of intentionally generating a position error signal in a data recording drive, comprising:
  writing a pattern of time-based servo transitions including first servo transitions non-parallel to second servo transitions, wherein the first servo transitions define a series of parallel servo transitions on at least a portion of a linear recording medium; and
  modulating distance, as a function of location on the medium, between adjacent parallel servo transitions to encode the position error signal such that when the data recording drive is designed to expect essentially no modulated distance between adjacent parallel servo transitions on the medium, the data recording drive will generate the position error signal.

9. The method of claim 8, in which the adjacent parallel servo transitions are immediately adjacent.

10. The method of claim 8, in which writing comprises adjusting clock timing in a servo write head timing circuit.

11. The method of claim 8, in which writing comprises adjusting position of the linear recording medium relative to a fixed servo write head.

12. The method of claim 8, in which writing comprises adjusting position of a servo write head relative to the linear recording medium.

13. The method of claim 8, in which the method comprises generating the position error signal in a step response pattern.

14. The method of claim 8, in which the method comprises generating the position error signal in a pulse response pattern.

15. The method of claim 8, in which the method comprises generating the position error signal in a frequency response pattern.

16. A method of measuring step response of a servopositioning system in a recording drive designed to expect essentially no modulation of distance between adjacent parallel servo transitions on a linear recording medium, comprising:
  a) at first and second longitudinal locations on the medium, writing a pattern of servo transitions including sets of non-parallel servo transitions, the sets of non-parallel servo transitions defining parallel servo transitions that have respective first and second distances between adjacent parallel servo transitions that differ from each other, the first and second distances being encoded to define position error signals such that the recording drive designed to expect essentially no modulated distance between adjacent parallel servo transitions on the medium will generate the position error signals; and
  c) reading the position error signals at each longitudinal location.

17. The method of claim 13, in which the adjacent parallel servo transitions are immediately adjacent.

18. The method of claim 13, in which the position error signals are read while the linear recording medium moves relative to the servo head at constant speed.

19. The method of claim 13, in which writing comprises adjusting clock timing in a servo write head timing circuit.

20. The method of claim 13, in which writing comprises adjusting position of the linear recording medium relative to a fixed servo write head.

21. The method of claim 13, in which writing comprises adjusting position of a servo write head relative to the linear recording medium.

22. A method of simulating rapid transient motion of a linear recording medium, comprising:
  a) at a first transverse location on the medium, writing a time-based servo pattern including first servo transitions non-parallel to second servo transitions, wherein the first servo transitions define a series of parallel servo transitions on at least a portion of the medium;
  b) modulating distance, as a function of location on the medium, between adjacent parallel servo transitions to encode a position error signal such that a drive designed to expect essentially no modulated distance between adjacent parallel servo transitions on the medium will generate the position error signal; and
  c) repeating the writing and modulating steps at a second transverse location.

23. The method of claim 22, in which the adjacent parallel servo transitions are immediately adjacent.

24. The method of claim 22, further comprising moving the linear recording medium relative to the servo read head of a recording drive at constant speed.

25. The method of claim 22, in which writing comprises adjusting clock timing in a servo write head timing circuit.

26. The method of claim 22, in which writing comprises adjusting position of the linear recording medium relative to a fixed servo write head.

27. The method of claim 22, in which writing comprises adjusting position of a servo write head relative to the linear recording medium.

28. The method of claim 22, further comprising reading the position error signal at each transverse location with a recording drive, and disabling a data write function in the drive if the position error signal exceeds a stop write limit.

29. A method of evaluating performance of a linear recording drive designed to expect essentially no modulation of distance between adjacent parallel servo transitions on a linear recording medium compatible with the drive, comprising:

a) providing a medium having a series of parallel servo transitions having distances between adjacent parallel servo transitions which have been modulated as a function of location of the transitions on the medium to encode a position error signal such that the linear recording drive designed to expect essentially no modulated distance between adjacent parallel servo transitions on the medium will generate the position error signal;

b) using the drive to read the position error signal at each transverse location on the medium; and c) comparing the position error signal to an expected value.

30. The method of claim 29, in which the adjacent parallel servo transitions are immediately adjacent.

31. The method of claim 29, in which the position error signal is read while the linear recording medium is moving at constant speed.

32. The method of claim 29, in which writing comprises adjusting clock timing in a servo write head timing circuit.

33. The method of claim 29, in which writing comprises adjusting position of the linear recording medium relative to a fixed servo write head.

34. The method of claim 29, in which writing comprises adjusting position of a servo write head relative to the linear recording medium.

* * * * *